United States Patent [19]

Hodge

[11] E Re. 30,890

[45] Reissued Mar. 30, 1982

[54] TRASH CONTAINER LID SYSTEM

[76] Inventor: Allan M. Hodge, 5852 Lomond Dr., San Diego, Calif. 92120

[21] Appl. No.: 964,118

[22] Filed: Nov. 28, 1978

Related U.S. Patent Documents

Reissue of:

[64] Patent No.: 3,994,415
Issued: Nov. 30, 1976
Appl. No.: 634,049
Filed: Nov. 21, 1975

U.S. Applications:

[63] Continuation of Ser. No. 494,549, Aug. 5, 1974, abandoned.

[51] Int. Cl.[3] ..... B65D 43/16; B65D 43/20

[52] U.S. Cl. ..... 220/331; 294/73; 294/361; 220/1 T; 220/335; 220/345

[58] Field of Search ..... 220/331, 329, 1 T, 318, 220/345, 335; 294/72, 73, 69 A; 414/306, 312, 328; 49/208, 245; 312/322, 323, 309, 310; 296/100, 101; 16/179

[56] References Cited

U.S. PATENT DOCUMENTS

| | | | |
|---|---|---|---|
| 1,743,531 | 1/1930 | Clarkson | 312/323 X |
| 1,899,837 | 2/1933 | Ulrich | 312/323 X |
| 1,918,475 | 7/1933 | Lassinsky | 49/250 X |
| 2,292,092 | 8/1942 | Shankweiler | 220/331 |
| 2,338,477 | 1/1944 | Wolters et al. | 220/331 |
| 2,416,132 | 2/1947 | Watson . | |
| 2,532,830 | 12/1950 | Barnhart et al. . | |
| 2,545,959 | 3/1951 | King . | |
| 2,569,254 | 9/1951 | Page | 220/331 X |
| 2,590,028 | 3/1952 | Miller | 49/260 X |
| 2,661,119 | 12/1953 | Spiess, Jr. et al. . | |
| 2,669,499 | 2/1954 | Vanderplank | 49/257 X |
| 2,681,165 | 6/1954 | Kornhauser et al. | 220/331 |
| 2,682,351 | 6/1954 | Durand et al. | 220/331 |
| 2,791,348 | 5/1957 | Adams . | |
| 3,136,575 | 6/1964 | Kollins . | |
| 3,186,756 | 6/1965 | Sant et al. | 16/179 X |
| 3,487,887 | 1/1970 | Pensa | 220/331 X |
| 3,490,642 | 1/1970 | Friedlander . | |
| 3,567,062 | 3/1971 | Reed et al. . | |
| 3,628,685 | 12/1971 | Gordon | 220/334 |
| 3,687,317 | 8/1972 | Gagel . | |
| 3,831,799 | 8/1974 | Nutt | 220/4 F |
| 3,836,036 | 9/1974 | Hodge . | |
| 3,951,302 | 4/1976 | Owen | 220/331 |
| 3,989,162 | 11/1976 | Hodge et al. | 220/331 |

FOREIGN PATENT DOCUMENTS

| | | | |
|---|---|---|---|
| 510279 | 2/1955 | Canada . | |
| 579313 | 7/1959 | Canada . | |
| 621072 | 5/1961 | Canada . | |
| 1167738 | 4/1964 | Fed. Rep. of Germany . | |
| 1281167 | 10/1968 | Fed. Rep. of Germany . | |
| 537362 | 5/1922 | France | 220/335 |
| 546337 | 11/1922 | France | 220/331 |
| 83592 | 12/1956 | Netherlands . | |
| 288298 | 1/1950 | Switzerland | 296/100 |
| 530916 | 1/1973 | Switzerland . | |
| 1036923 | 7/1964 | United Kingdom . | |
| 1476934 | 6/1977 | United Kingdom . | |

*Primary Examiner*—Allan N. Shoap
*Attorney, Agent, or Firm*—Poms, Smith, Lande & Rose

[57] ABSTRACT

A trash container lid system for placement on top of large industrial trash bins of the type utilized in hotels, apartment houses, etc., in which a lid section counterweighted in the rear portion thereof is slidably and rotatably coupled to a trash bin via a roller in the mid portion of the lid section in a track on the top of the side edges of the trash bin and a roller in the rearward bottom portion of the lid section trapped in an arcuate downwardly extending track so that by sliding the lid to the rear the back track automatically raises the front of the lid section for the deposit of trash therein and upon inverting the trash bin, the lid section automatically falls completely open.

10 Claims, 4 Drawing Figures

TRASH CONTAINER LID SYSTEM

Matter enclosed in heavy brackets [ ] appears in the original patent but forms no part of this reissue specification; matter printed in italics indicates the additions made by reissue.

RELATED APPLICATIONS

This application is a continuation of an application for U.S. Letters Pat. filed by ALLAN M. HODGE on Aug. 5, 1974, Ser. No. 494,549 now abandoned for TRASH CONTAINER LID SYSTEM. An application for U.S. Letters Patent has been filed by ALLAN M. HODGE on Feb. 8, 1973, Ser. No. 330,569, for TRASH CONTAINER LID SYSTEM, now issued at U.S. Pat. No. 3,836,036 on Sept. 17, 1974.

BRIEF DESCRIPTION OF THE INVENTION

The present invention relates to a trash container lid system and more particularly to a trash container lid system having a stabilized partially open position.

According to the invention, a trash container lid system is provided which is slidably and rotatably coupled to a trash bin via a first pair of rollers rotatably carried by the lid section in its lower mid portion riding on roller tracks on the top of the side edges of the trash container and a second pair of rollers each roller being trapped in an arcuate downwardly extending roller track extending from the top of the back portion of the trash bin. Hence, when the lid is pushed toward the rear of the trash bin and away from the front of the trash bin, it will automatically tilt until the trapped rollers each reach the end of the in arcuate tracks. In this position, a counterweight located in the rear portion of the lid section holds the lid in open position until after the trash has been dumped and the lid pulled toward the front. Upon dumping the trash bin in the normal manner when forks on the trash truck lift the entire assembly over the cab of the truck and invert the entire trash bin, the lid will automatically fall open in a vertical position since the top centrally located rollers are not trapped in a roller track. This, of course, allows a complete emptying of the trash bin when desired.

An object of the present invention is the provision of an improved trash container lid system.

Another object of the invention is the provision of a trash container lid assembly having a stabilized partially opened position.

A further object of the invention is the provision of an improved trash container lid system utilizing a counterweight.

Yet another object of the invention is the provision of a trash container lid assembly requiring a minimum of force in opening and closing.

Other objects and many of the attendant advantages of the present invention will be readily appreciated as the same becomes better understood by reference to the following detailed description when considered in connection with the accompanying drawings in which like reference numerals designate like parts throughout the Figures thereof and wherein.

DETAILED DESCRIPTION OF THE DRAWING

Figure 1:
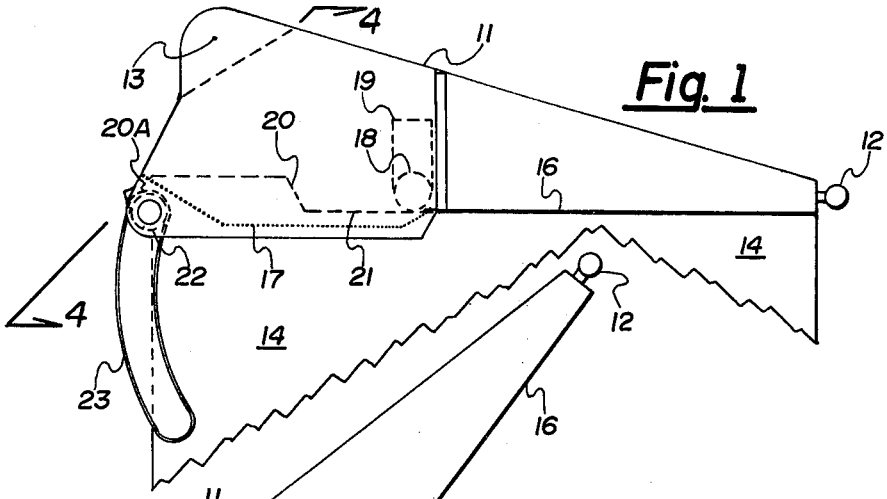
FIG. 1 is a side elevational view of a preferred embodiment of the present invention in a closed position.
Figure 2:
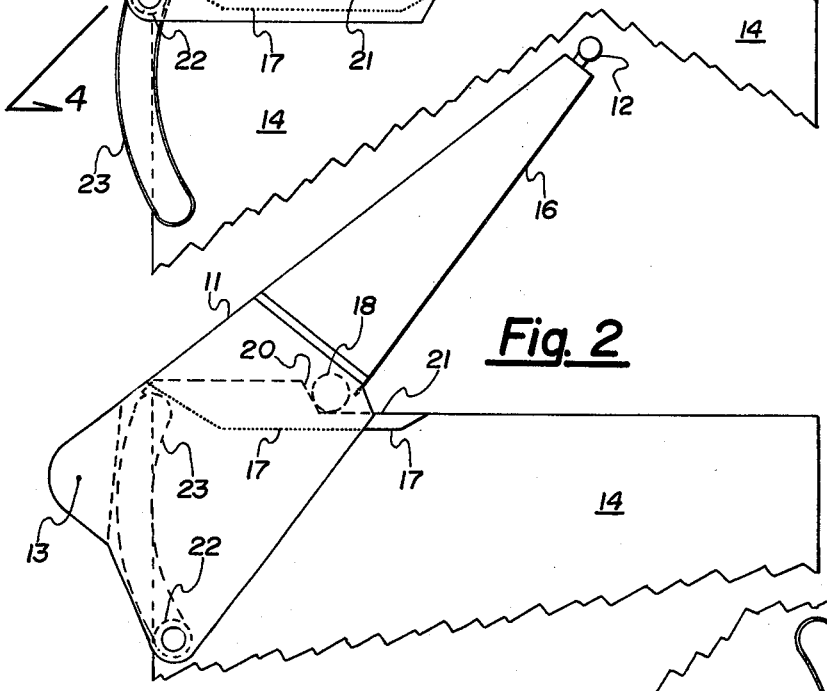
FIG. 2 is a side elevation of the embodiment of FIG. 1 in an open position.
Figure 3:
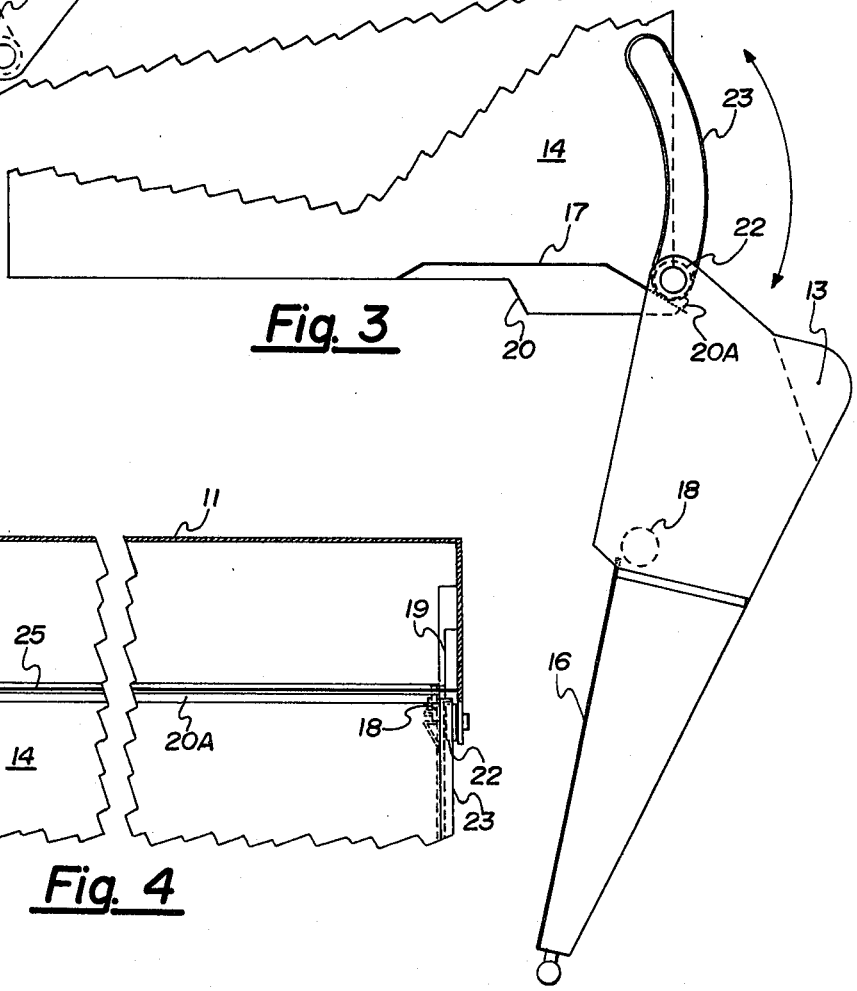
FIG. 3 is a side elevational view of the present invention inverted for dumping.

Referring to FIGS. 1, 2 and 3, a lid assembly 11 has a front handle 12 and a back counterweight section 13. Lid section 11 is carried by trash bin 14 with front seal 16 and a rearward lip type of seal 17 such as that disclosed in the above referenced U.S. Pat. No. 3,836,036. Lid section 11 has a pair of centrally located rollers 18 rotatably carried by mounting brackets 19 which are fixedly attached to lid section 11. Rollers 18 are carried by horizontal rollers tracks 21. Rear roller 22 is rotatably carried by lid section 11 and are trapped within arcuate downwardly extending roller tracks 23. Horizontal roller tracks 21 terminate in a raised portion 20 of the rearward section of the top edge of trash bin 14.

Figure 4:
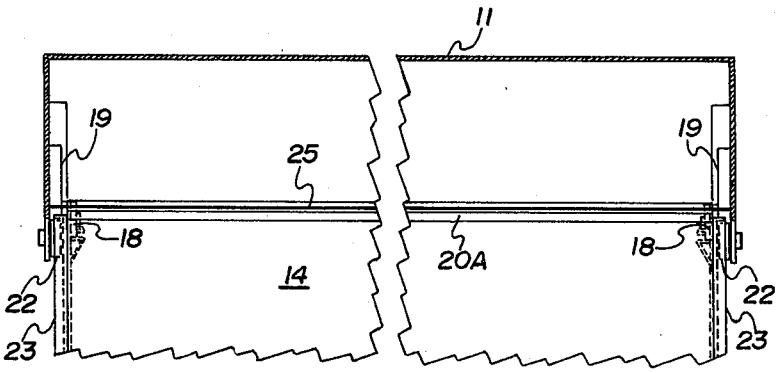
FIG. 4 is a back elevational view of the embodiment of FIG. 1 with the lid portion sectioned.

Referring to FIG. 4, bin 14 is shown disposed beneath lid section 11 with rear rollers 22 trapped within downwardly extending arcuate roller tracks 23 which are fixedly attached at the sides of bin 14. A seal is shown at 25 on angle bracket 20A coupled to raised portion 20 (FIGS. 1, 2 and 3).

OPERATION

Referring back to FIG. 1, it can be seen that in the closed position, lid section 11 has a front portion seal 16 resting firmly on the top edge of the trash bin 14. A lip seal 17 completes the seal across the entire surface of the side of bin 14. When the handle 12 of lid section 11 is raised, back roller 22 begins its descent down arcuate track 23 and mid section roller 18 begins rolling along track 21 toward the rear. Roller 18 is kept on the surface of track 21 due to the fact that it acts as a pivot or fulcrum point as the lid section drops guided by track 23 and roller 22. The counterweight section 13 renders the lifting force required on handle 12 very minimal. When roller 18 reaches raised portion 20 of the top edge of the trash bin 14, the rearward roller 22 simultaneously reaches the end of closed roller track 23 and the lid is then in the position shown in FIG. 2. At this point, counterweight section 13 is enough to balance the lid section 11 in the position shown. When it is desired to re-close the lid section 11, handle 12 is merely pulled in a downward and/or forward direction, again requiring very little force and the opposite action takes place. Here a forward stop for roller 18 is not essential because the front portion of lid section 11 having seal 16 rests on the top edges of trash bin 14.

When the dumping of trash bin 14 is required, the entire unit is inverted via conventional dump trucks and rollers 18 will leave track 21 and the entire lid section will hang vertically below trash bin 14, thereby allowing all of the trash to be dumped. In this position rollers 22 reach the end of closed track 23 which secure lid section 11 to trash bin 14, and the bottom rear corners of lid section 11 contact angle 20A of bin 14.

It should be understood, of course, that the foregoing disclosure relates to only a preferred embodiment of the invention and that it is intended to cover all changes and modifications of the example of the invention herein chosen, for the purposes of the disclosure, which do not constitute departures from the spirit and scope of the invention.

The invention claimed is:

1. A trash lid container system comprising:

a trash bin having a top edge;

a lid having a bottom edge dimensioned for cooperation with the top edge of the trash bin;

a pair of mounting brackets attached to and depending from the sides of said lid substantially midway between the front and back ends of said sides;

first and second rollers rotatably carried by said mounting brackets attached to said lid;

relatively short horizontal first and second roller tracks on the top edge of opposite sides of said trash bin terminating in a raised stop portion and rotatably carrying said first and second rollers, respectively;

a pair of downwardly extending arcuate roller tracks fixedly attached to the back portion of said trash bin; and third and fourth rollers rotatably carried by a back portion of said lid, said third and fourth rollers being trapped within said pair of downwardly extending arcuate roller tracks, respectively, said first and second rollers forming a slidable pivot for said lid section to pivot open as it moves rearwardly, when said first and second rollers engage said raised stop portions of said first and second roller tracks.

2. The trash lid container system of claim 1 wherein said lid includes a counterweight adjacent to the rear of said lid operable for holding said lid in a partially open position.

*3. A trash lid container system comprising:*

*a trash bin having a top edge;*

*a lid having a bottom edge dimensioned for cooperation with the top edge of the trash bin;*

*first and second rollers;*

*means for rotatably mounting said first and second rollers from the sides of said lid substantially midway between the front and back ends of said sides;*

*relatively short horizontal first and second roller tracks on the top edge of opposite sides of said trash bin terminating in a raised stop and rotatably carrying said first and second rollers, respectively, said first and second rollers together with their mounting means and the associated portion of the lid being unrestricted against vertical movement;*

*a pair of downwardly extending roller tracks fixedly attached to the back portion of said trash bin;*

*third and fourth rollers rotatably carried by a back portion of said lid, said third and fourth rollers being trapped within said pair of downwardly extending roller tracks, respectively, said first and second rollers forming a slidable pivot for said lid section to pivot open as it moves rearwardly, whereby said lid may be partially opened with minimal force for the depositing of trash when said bin is upright; and*

*said system including means to permit said lid to swing completely open for dumping with said lid pivoting about said third and fourth rollers in the ends of said tracks near the upper rear corners of said bin when said bin is inverted for dumping, and said lid may be partially opened under the control of said first and second rollers on said first and second tracks and under the control of said third and fourth rollers moving in said downwardly extending tracks when said bin is upright.*

*4. A trash bin and lid system as defined in claim 3 further comprising counterweight means mounted adjacent the rear of said lid.*

*5. A trash bin and lid system of the type in which the trash bin is filled when it is in the normal upright orientation and is dumped by inverting the trash bin, comprising:*

*a trash bin;*

*a lid for said bin, said lid having a top and sides;*

*roller means for supporting said lid on the upper surface of each of the sides of said bin in the midportion of said lid to permit easy opening of said lid;*

*means for guiding and restraining the rear of said lid as it is opened, the guiding and restraining means including a pair of rollers extending laterally inwardly from the rear corners of said sides of said lid, and a pair of downwardly extending tracks secured to upper corners of said bin and encompassing said rollers, for guiding the position of the rear of said lid as it is partially opened using the roller supporting means while said bin is in the upright orientation;*

*means for stopping the movement of said lid in a partially open position when it is opened in the upright orientation;*

*counterweight means mounted adjacent the rear of said lid; and*

*said system including means to permit said lid to swing wide open with said lid pivoting about said rollers in one end of said tracks and with said roller supporting means and the stopping means not interacting between the bin and the lid when said bin is turned upside down for dumping and said lid may be partially opened with minimal force by slidable pivoting movement of said roller means for disposing of trash when the trash bin is upright.*

*6. A trash bin and lid system as defined in claim 5 wherein said stopping means includes an upstanding wall for blocking the movement of the roller means for supporting said lid.*

*7. A trash lid container system comprising:*

*a trash bin having a top edge;*

*a lid having a bottom edge dimensioned for cooperation with the top edge of the trash bin;*

*first and second rollers;*

*means for rotatably mounting the first and second rollers from the sides of said lid substantially midway between the front and back ends of said sides;*

*relatively short horizontal first and second roller tracks on the top edge of opposite sides of said trash bin terminating in a raised stop and rotatably carrying said first and second rollers, respectively; said first and second rollers together with their mounting means and the associated portion of the lid being unrestricted against vertical movement, whereby said bin may be dumped with the lid completely open when said bin is raised and inverted;*

*a pair of downwardly extending roller tracks fixedly attached to the back portion of said trash bin; and*

*third and fourth rollers rotatably carried by a back portion of said lid, said third and fourth rollers being trapped within said pair of downwardly extending roller tracks, respectively, said first and second rollers forming a slidable pivot for said lid section to pivot open as it moves rearwardly, whereby said lid may be partially opened with minimal force for the depositing of trash when said bin is upright.*

*8. A trash lid container system comprising:*

*a trash bin having a top edge;*

*a lid having a bottom edge dimensioned for cooperation with the top edge of the trash bin;*

*first and second rollers;*

*means for rotatably mounting said first and second rollers from the sides of said lid substantially midway between the front and back ends of said sides;*

*relatively short horizontal first and second roller tracks on the top edge of opposite sides of said trash bin, and rotatably carrying said first and second rollers, respectively, said first and second rollers together with their mounting means and the associated portion of the lid being unrestricted against vertical movement;*

*a pair of downwardly extending roller tracks fixedly attached to the back portion of said trash bin;*

*third and fourth rollers rotatably carried by a back portion of said lid, said third and fourth rollers being trapped within said pair of downwardly extending roller tracks, respectively, said first and second rollers forming a slidable pivot for said lid section to pivot open as it moves rearwardly, whereby said lid may be partially opened with minimal force for the depositing of trash when;*

*said system including means to permit said lid to swing completely open with said lid pivoting about said third and fourth rollers in the ends of said tracks near the upper rear corner of said bin when said bin is inverted for dumping, and said lid may be partially opened when said lid is upright; and*

*means for stopping the movement of said lid in a partially open position when said lid is opened with said bin in the upright orientation.*

*9. A trash lid container system as defined in claim 8 wherein the stopping means comprises two upstanding walls for blocking the movement of at least two of said rollers.*

*10. A trash lid container system comprising:*

*a trash bin having a top edge;*

*a lid having a bottom edge dimensioned for cooperation with the top edge of the trash bin;*

*first and second rollers;*

*means for rotatably mounting said first and second rollers from the sides of said lid substantially midway between the front and back ends of said sides;*

*relatively short horizontal first and second roller tracks on the top edge of opposite sides of said trash bin terminating in a raised stop and rotatably carrying said first and second rollers, respectively, said first and second rollers being unrestricted against vertical movement;*

*a pair of downwardly extending roller tracks fixedly attached to the back portion of said trash bin;*

*third and fourth rollers rotatably carried by a back portion of said lid, said third and fourth rollers being trapped within said pair of downwardly extending roller tracks, respectively, said first and second rollers forming a slidable pivot for said lid section to pivot open as it moves rearwardly, whereby said lid may be partially opened with minimal force for the depositing of trash when said bin is upright; and*

*said system including means for permitting said lid to swing completely open for dumping with said lid pivoting about said third and fourth rollers in the ends of said tracks near the upper rear corners of said bin when said bin is inverted for dumping, and said lid may be partially opened under the control of said first and second rollers on said first and second tracks and under the control of said third and fourth rollers moving in said downwardly extending tracks when said bin is upright.*

* * * * *